United States Patent
Beckmann et al.

(10) Patent No.: US 6,491,336 B1
(45) Date of Patent: Dec. 10, 2002

(54) HOLDER PLATE CONFIGURATION

(75) Inventors: Friedhelm Beckmann, Hiddenhausen (DE); Uwe Bünte, Bramsche (DE); Michael Elsner, Steinhagen (DE)

(73) Assignee: Henkel KGaA, Duesseldorf (DE)

( * ) Notice: Subject to any disclaimer, the term of this patent is extended or adjusted under 35 U.S.C. 154(b) by 0 days.

(21) Appl. No.: 09/514,873

(22) Filed: Feb. 28, 2000

(30) Foreign Application Priority Data

Feb. 26, 1999 (DE) ........................................ 199 08 347

(51) Int. Cl.⁷ .............................................. B60R 27/00
(52) U.S. Cl. ...................... 296/187; 296/39.3; 296/204
(58) Field of Search ................. 296/187, 39.3, 296/204

(56) References Cited

U.S. PATENT DOCUMENTS

| | | | | |
|---|---|---|---|---|
| 3,731,449 A | * | 5/1973 | Kephart, Jr. ................ 428/160 |
| 4,440,434 A | * | 4/1984 | Celli ...................... 296/187 X |
| 4,704,837 A | * | 11/1987 | Menchetti et al. ............. 52/273 |
| 4,921,373 A | * | 5/1990 | Coffey ........................ 405/115 |
| 5,102,188 A | * | 4/1992 | Yamane .................. 296/187 X |
| 5,129,519 A | * | 7/1992 | David et al. ................. 206/523 |
| 5,766,719 A | * | 6/1998 | Rimkus ........................ 428/71 |
| 5,806,915 A | * | 9/1998 | Takabatake .................. 296/187 |
| 6,092,864 A | * | 7/2000 | Wycech et al. ......... 296/187 X |
| 6,135,542 A | * | 10/2000 | Emmelmann et al. .. 296/187 X |

* cited by examiner

*Primary Examiner*—D. Glenn Dayoan
*Assistant Examiner*—Lori L Coletta
(74) *Attorney, Agent, or Firm*—Laurence A. Greenberg; Werner H. Stemer; Ralph E. Locher

(57) ABSTRACT

A holder plate has two individual plates that extend at a distance from one another and are connected with each other by a film hinge. The hollow space between the individual plates is filled with an expandable material. For the fixation of the functional position of the holder plate at least one clamping and fixation element is pushed on the outer surfaces of the individual plates. The individual plates can also be connected with each other by integrally formed locking elements. The clamping and fixation element is advantageously formed as one piece. The individual plates of the holder plate can be produced in their unfolded state and can be folded into their functional position. When the expandable material is applied in partial segments to the individual plates of the holder plate, the partial segments are provided with a film hinge such that they can be flipped into the functional position.

28 Claims, 3 Drawing Sheets

HOLDER PLATE CONFIGURATION

BACKGROUND OF THE INVENTION

Field of the Invention

The invention relates to a holder plate configuration with a fixation element for fixing a holder plate in a functional position.

The production of holder plates, which are made of two or more materials and in which one material is to be encapsulated over the full area or in partial areas between two plates, poses the problem that a complex production tool is required to produce these holder plates as a single piece. Also, the geometric configuration of the holder plate is limited due to the position within the tool. The fixation of the entire holder plate, e.g., in the interior of the hollow space structures of automobiles, furthermore requires locking connections or clip-on connections or some other fastening elements, which further increase the complexity of the tool. The one-piece production of holder plates with locking or fastening connections necessarily requires that the holder plates and the fasting elements be made of the same material. As a result, the area subject to the highest material stress determines the material quality.

SUMMARY OF THE INVENTION

It is accordingly an object of the invention to provide a holder plate configuration which overcomes the above-mentioned disadvantages of the heretofore-known holder plates of this general type and which permits a simple tool configuration for its production and which also allows a substantially faster and thus more cost-effective production of the holder plate configuration.

With the foregoing and other objects in view there is provided, in accordance with the invention, a holder plate configuration, including a holder plate having two individual plates and a film hinge connecting the two individual plates extending spaced at a distance from one another for defining an interstice therebetween, the holder plate having an outer surface and having an expandable material filling the interstice; and one or more clamping and fixation elements for fixing the holder plate in a functional position, preferably in a functional position in an interior region of a hollow space structure of a motor vehicle, the clamping and fixation elements are pushed onto the outer surface of the holder plate; and/or locking elements formed integral with the holder plate for connecting the individual plates.

In other words, the object of the invention is achieved in that the individual plates of the holder plate are connected with each other by a film hinge and that for fixing the functional position of the holder plate one or several clamping and fixation elements are directly pushed onto the outer surfaces of the individual plates and/or the individual plates are connected with each other via integrally formed locking elements. The clamping and fixation element can be formed as a single piece.

In a preferred embodiment of the invention, the clamping and fixation element has a central seat the inside width of which approximately corresponds to the thickness of the holder plate.

In accordance with another feature of the invention, the lateral boundaries of the central seat can be laterally spread apart.

In another preferred embodiment, locking nubs are provided on the inner surfaces of the lateral boundaries of the central seat, with the individual plates being provided with correspondingly associated locking elements.

The individual plates may each be provided with a corresponding groove that starts on the underside and in width and length approximately corresponds to the central seat of the clamping and fixation element.

The central seat and thus also the groove extend approximately over 50% of the total height of the clamping and fixation element. The lateral boundaries of the clamping and fixation element may conically widen in a downward direction. When the clamping and fixation element is pushed on, it locks or clamps together with the individual plates of the holder plate.

In a further embodiment of the invention, the expandable material is applied as a partial segment to each of the inner surfaces of the individual plates.

In a preferred embodiment, the partial segments of the expandable material are connected with each other by a film hinge, whereby an individual plate together with the associated partial segment of expandable material can be swung into the functional position of the holder plate after completion.

In accordance with another feature of the invention, the clamping and fixation element has outer sides and has reinforcement ribs provided at the outer sides.

In accordance with yet another feature of the invention, one of the individual plates has an angled portion pointing toward the other one of the individual plates, the other one of the individual plates has a bent region with an upper locking hook engaging with the angled portion.

In accordance with a further feature of the invention, the individual plates have openings for allowing a coating medium or varnishing medium to flow therethrough.

In accordance with another feature of the invention, the clamping and fixation elements or the individual plates are injection molded elements formed of a chemical material.

In accordance with yet another feature of the invention, the holder plate is produced in a two-component process, wherein the partial segments of the expandable material are deposited on the individual plates right after the individual plates are produced.

In accordance with a further feature of the invention, the individual plates have different dimensional sizes.

In accordance with another feature of the invention, the holder plate has completely or partially sealed end faces and/or completely or partially sealed cover surfaces.

In accordance with yet another feature of the invention, the individual plates and the clamping and fixation elements are made of different materials.

In accordance with a further feature of the invention, the distance defining the interstice between the individual plates is determined by the thickness of the expandable material.

In accordance with another feature of the invention, the holder plate has locking elements formed integral with the holder plate for connecting the individual plates.

As a result of the configuration according to the invention, the individual plates can be manufactured in their unfolded state and, to form the functional position, can be folded into the required reference plane. When the expandable material is applied in partial segments to the partial plates of the holder plate, the partial segments are provided with a film hinge so that they can be flipped into the functional position.

Other features which are considered as characteristic for the invention are set forth in the appended claims.

Although the invention is illustrated and described herein as embodied in a holder plate with clamping and fixation elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
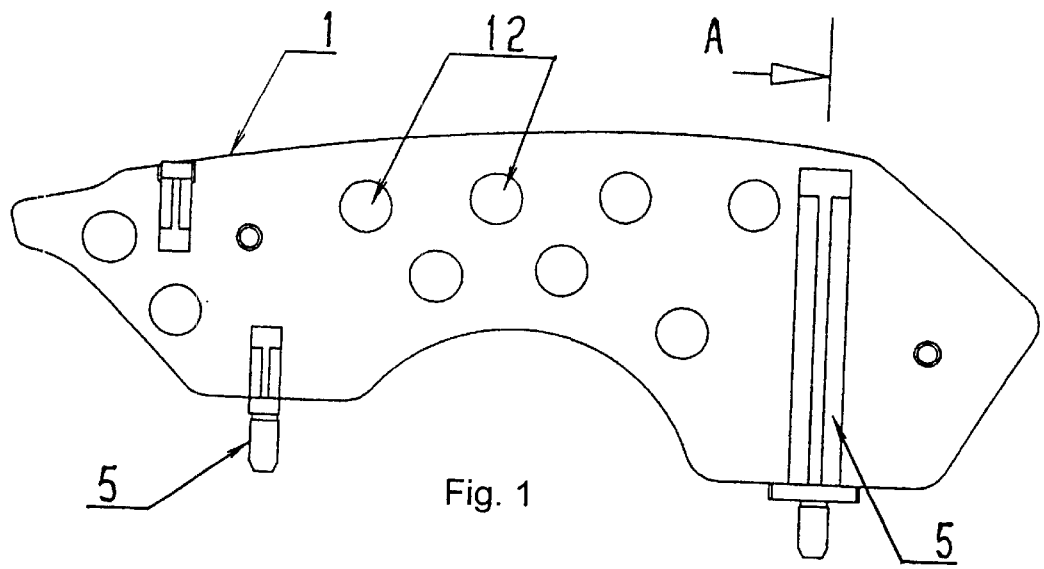
FIG. 1 is a side view of a holder plate with three associated clamping and fixation elements.
Figure 2:
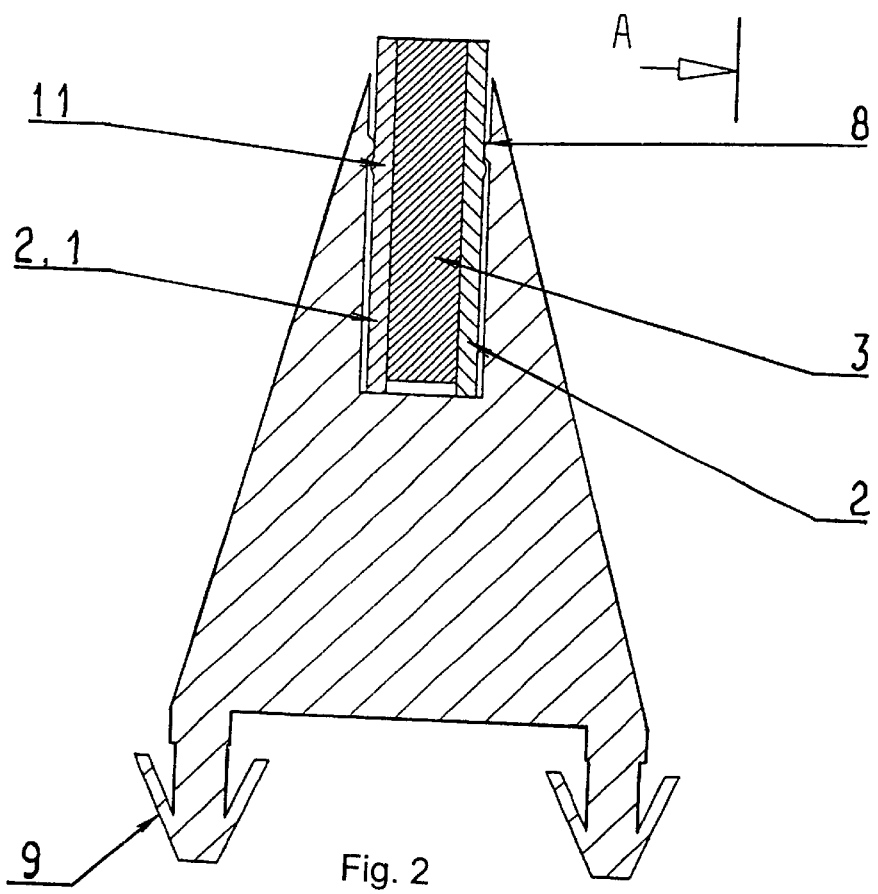
FIG. 2 is a vertical, sectional view along line A—A in FIG. 1.
Figure 3:
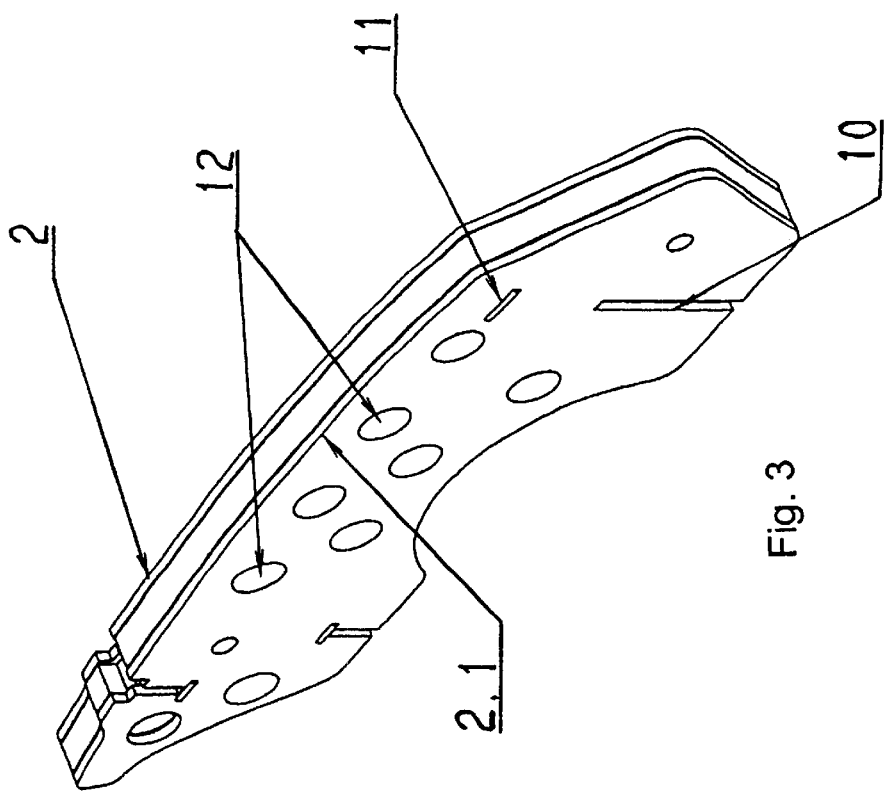
FIG. 3 is a perspective view of a holder plate without clamping and fixation elements.
Figure 4:
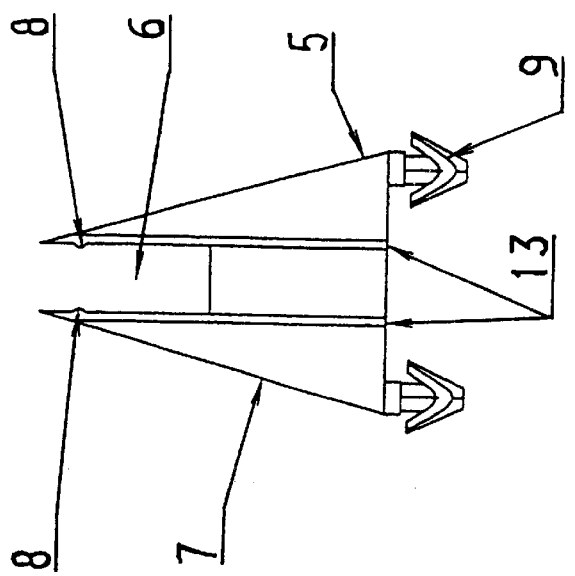
FIG. 4 is a side view of a clamping and fixation element.
Figure 5:
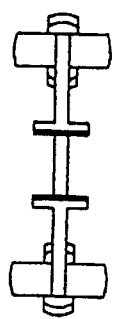
FIG. 5 is a top view of a clamping and fixation element.

Referring now to the figures of the drawings in detail, there is shown a holder plate 1 which has two individual plates 2 and 2.1 extending parallel at a distance to each other, whereby the gap thus formed is filled with an expandable material 3, such as a foamable or foamed material. To form the holder plate 1, the individual plates 2 and 2.1 are held in a predetermined position by a one-piece clamping and fixation element 5 that can be pushed on. The clamping and fixation element 5 has a central seat 6, the inside width of which approximately corresponds to the thickness of the holder plate 1. The clamping and fixation element 5, when pushed onto holder plate 1, engages with its central seat 6 with a correspondingly formed groove 10 of the holder plate 1, whereby the lateral boundaries 7 of the central seat 6 can be slightly laterally spread apart. To ensure the correct position of the clamping and fixation element 5 on the holder plate 1, locking nubs 8 are provided on the inner surfaces of the lateral boundaries 7 of the central seat 6 of the clamping and fixation element 5, which are associated with correspondingly profiled locking elements 11 of the individual plates 2 and 2.1. As shown in FIG. 4, the central seat 6 extends approximately over 50% of the total height of the clamping and fixation element 5. The lateral boundaries 7 conically widen in a downward direction. To increase stability, vertically extending reinforcement ribs 13 are provided on the clamping and fixation element. The holes 12 formed in the individual plates 2 and 2.1 permit a coating or varnishing medium to flow therethrough. Protruding fixation spurs 9 are provided on the underside of the clamping and fixation element 5.

Figure 6:
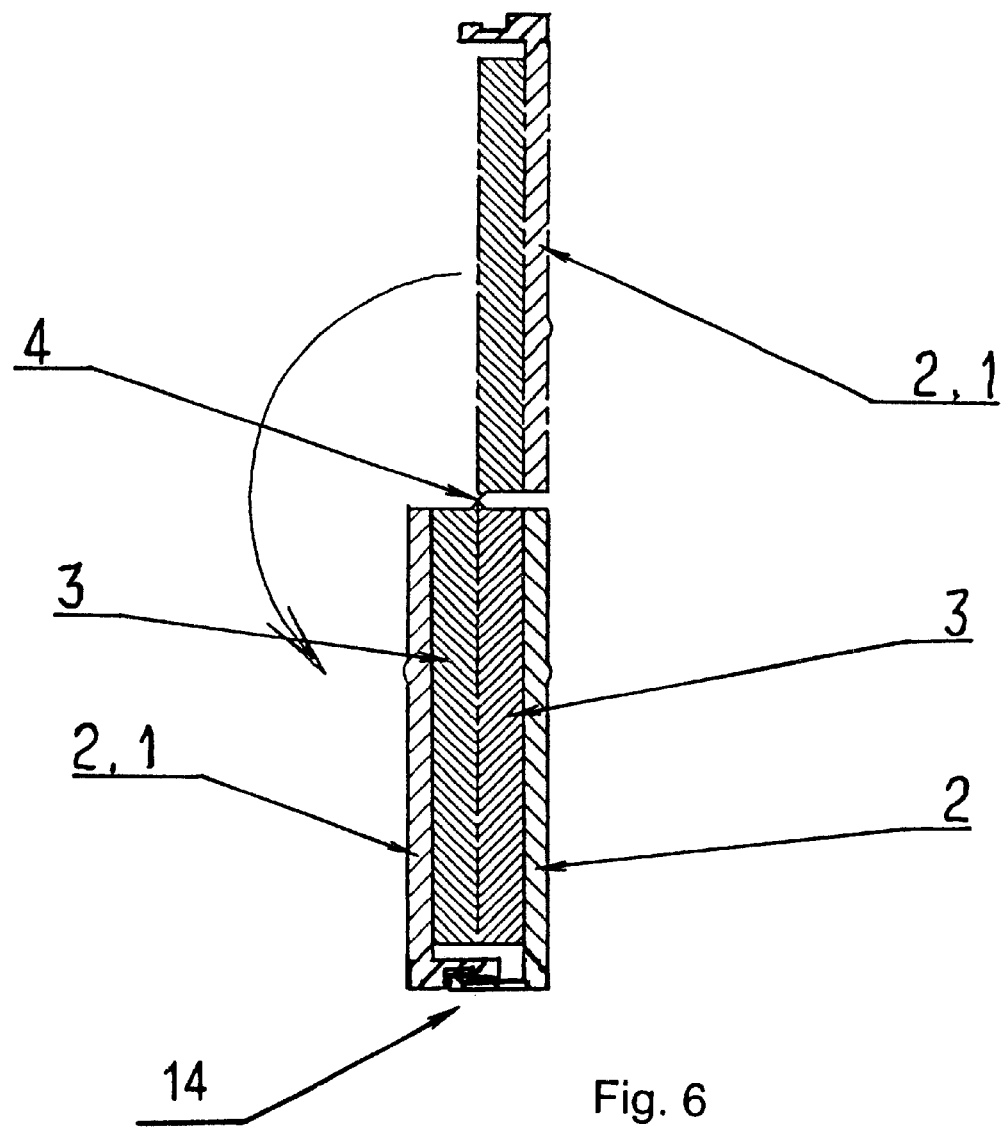
FIG. 6 is a vertical, sectional view through a holder plate indicating the position before and after the upper partial plate is swung around.

According to FIG. 6, as indicated by hatching, a respective partial segment of the expandable material 3 is deposited on each of the individual plates 2 and 2.1 located in a plane, one above the other. Via the film hinge 4 the partial segments of the expandable material 3 swing downwardly by 180° to form the holder plate 1. The holder plate may be provided with locking elements 14 formed integral with the holder plate for connecting the individual plates. The locking elements may for instance be embodied as a snap connection or a clamp connection. For instance, one plate may have an angled portion pointing toward the other plate, whereas the other plate has a bent region with an upper locking hook engaging with the angled portion.

A configuration as shown in the figures substantially reduces tool costs for producing the configuration. Also, after the production of clamping and fixation element 5, a space saving stacking is possible.

We claim:

1. A holder plate configuration, comprising:
    a holder plate having two individual plates and a film hinge connecting said two individual plates extending spaced at a distance from one another for defining an interstice therebetween, said holder plate having an outer surface and having an expandable material filling said interstice; and
    a clamping and fixation element for fixing said holder plate in a functional position, said clamping and fixation element, pushing on said outer surface of said holder plate.

2. The holder plate configuration according to claim 1, wherein said clamping and fixation element is formed as a one-piece element.

3. The holder plate configuration according to claim 1, wherein said clamping and fixation element has a central seat.

4. The holder plate configuration according to claim 3, wherein said holder plate has a given thickness, said central seat has an inside width approximately corresponding to said given thickness of said holder plate.

5. The holder plate configuration according to claim 3, wherein said central seat has lateral boundary elements, said lateral boundary elements are spreadable apart from one another in a lateral direction.

6. The holder plate configuration according to claim 5, wherein said lateral boundary elements have inner surfaces and have locking nubs disposed on said inner surfaces.

7. The holder plate configuration according to claim 1, wherein said clamping and fixation element has an underside and has protruding fixation spurs disposed at said underside.

8. The holder plate configuration according to claim 3, wherein said clamping and fixation element has a total height, said central seat extends approximately over 50% of said total height of said clamping and fixation element.

9. The holder plate configuration according to claim 3, wherein said central seat has lateral boundary elements conically widening in a downward direction.

10. The holder plate configuration according to claim 1, wherein each respective one of said individual plates has a groove extending corresponding to said groove of the respective other one of said individual plates.

11. The holder plate configuration according to claim 10, wherein said groove in each of said individual plates has a width and a length approximately corresponding to said central seat of said clamping and fixation element.

12. The holder plate configuration according to claim 6, wherein said individual plates have locking elements assigned to said locking nubs disposed on said inner surfaces of said lateral boundary elements.

13. The holder plate configuration according to claim 1, wherein said clamping and fixation element has outer sides and has reinforcement ribs provided at said outer sides.

14. The holder plate configuration according to claim 1, wherein a first one said individual plates has an angled portion pointing toward a second one of said individual plates, said second one of said individual plates has a bent region with an upper locking hook engaging with said angled portion of said first one of said individual plates.

15. The holder plate configuration according to claim 1, wherein said individual plates have openings for allowing a coating medium to flow therethrough.

16. The holder plate configuration according to claim 1, wherein at least one of said clamping and fixation element and said individual plates is an injection molded element formed of a chemical material.

17. The holder plate configuration according to claim 1, wherein said individual plates have inner surfaces, said expandable material has partial segments deposited on said inner surfaces of said individual plates.

18. The holder plate configuration according to claim 17, wherein said partial segments of said expandable material are connected to one another by said film hinge.

19. The holder plate configuration according to claim 17, wherein one of said individual plates, after an associated one of said partial segments is deposited thereon, can be swung into the functional position.

20. The holder plate configuration according to claim 17, wherein said holder plate is producable in a two-component production, said partial segments of said expandable material deposited on said individual plates directly after production of said individual plates.

21. The holder plate configuration according to claim 1, wherein a first one of said individual plates has a first dimensional size, a second one of said individual plates has a second dimensional size different from said first dimensional size.

22. The holder plate configuration according to claim 1, wherein said holder plate has at least one of completely sealed end faces and completely sealed cover surfaces.

23. The holder plate configuration according to claim 1, wherein said holder plate has at least one of partially sealed end faces and partially sealed cover surfaces.

24. The holder plate configuration according to claim 1, wherein said individual plates and said clamping and fixation element are made of different materials.

25. The holder plate configuration according to claim 1, wherein said expandable material has a thickness determining the distance defining the interstice between the individual plates.

26. The holder plate configuration according to claim 1, wherein said holder plate has locking elements formed integral with said holder plate for connecting said individual plates.

27. A holder plate configuration, comprising:
a holder plate having two individual plates and a film hinge connecting said two individual plates extending spaced at a distance from one another for defining an interstice therebetween, said holder plate having a foamable material filling said interstice and having locking elements formed integral with plate for connecting said individual plates, said two individual plates defining an outwardly open space therebetween permitting an escape of said foamable material filled in said space.

28. In combination with a motor vehicle having a hollow space structure with an interior region, a holder plate configuration, comprising:
a holder plate having two individual plates and a film hinge connecting said two individual plates extending spaced at a distance from one another for defining an interstice therebetween, said holder plate having an outer surface and having an expandable material filling said interstice; and
a clamping and fixation element for fixing said holder plate in a functional position in the interior region of the hollow space structure of the motor vehicle, said clamping and fixation element pushing on said outer surface of said holder plate.

* * * * *